(12) United States Patent
Voss

(10) Patent No.: US 11,722,448 B1
(45) Date of Patent: Aug. 8, 2023

(54) MESSAGING SYSTEM WITH ARCHIVED DATA DISPLAY

(71) Applicant: Snap Inc., Santa Monica, CA (US)

(72) Inventor: Jeremy Voss, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 16/588,285

(22) Filed: Sep. 30, 2019

(51) Int. Cl.
*H04L 51/224* (2022.01)
*H04L 51/214* (2022.01)

(52) U.S. Cl.
CPC .............. *H04L 51/224* (2022.05); *H04L 51/214* (2022.05)

(58) Field of Classification Search
CPC ................. H04L 51/24; H04L 51/14
USPC ....................................................... 709/206
See application file for complete search history.

(56) References Cited

U.S. PATENT DOCUMENTS

| | | | | |
|---|---|---|---|---|
| 2005/0097002 A1* | 5/2005 | Araki | ............... | G06Q 30/0641 705/27.1 |
| 2005/0261031 A1* | 11/2005 | Seo et al. | ......... | H04M 1/72544 455/566 |
| 2006/0055992 A1* | 3/2006 | Koo | ....................... | H04N 9/804 358/527 |
| 2006/0256959 A1* | 11/2006 | Hymes | ............. | H04M 1/72403 379/433.04 |
| 2009/0193354 A1* | 7/2009 | Rhee et al. | .......... | G06Q 10/109 715/784 |
| 2012/0106917 A1* | 5/2012 | Momosaki et al. | .... | H04N 5/765 386/230 |
| 2016/0036822 A1* | 2/2016 | Kim et al. | ........... | H04L 67/306 726/4 |
| 2016/0119257 A1* | 4/2016 | Yun et al. | .............. | H04L 51/18 709/206 |
| 2016/0234345 A1* | 8/2016 | Roberts, Jr. et al. | . | H04L 67/306 |
| 2017/0161388 A1* | 6/2017 | Aziz et al. | ........... | G06Q 10/109 |

\* cited by examiner

*Primary Examiner* — Cheikh T Ndiaye
*Assistant Examiner* — Ayele F Woldemariam
(74) *Attorney, Agent, or Firm* — SCHWEGMAN LUNDBERG & WOESSNER, P.A.

(57) ABSTRACT

Systems and computer-implement methods of displaying archived data are provided for determining that it is an anniversary of the archived data, the archived data including a message transmitted from a first client device to a second client device; causing display, on the first client device, of a graphical indicium and an avatar of a user associated with the first client device, the graphical indicium indicating an anniversary associated with the message transmitted from the first client device to the second client device; causing, display on the first client device of a notification of the anniversary; and causing the display of the graphical indicium and notification of the anniversary to be removed after a predefined time.

20 Claims, 12 Drawing Sheets

MESSAGING SYSTEM WITH ARCHIVED DATA DISPLAY

TECHNICAL FIELD

The present disclosure relates to messaging systems, and particularly, but not exclusively, to retrieving and displaying archived data in a messaging system.

BACKGROUND

Electronic communications, such as e-mail or text messages, images, video, multimedia, and the like, over networks, such as the Internet, enable the quick communication of data between client devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example embodiments resurface archived data (e.g., media such as saved chat media) transmitted between mobile devices on an anniversary of the date the archived data was archived and/or created. The archived data can comprise ephemeral messages that were archived (e.g., saved to memory) despite being ephemeral. Embodiments display a tile indicating the date of the archived media (e.g., the exact date (e.g., Feb. 5, 2017) or relative date (e.g., 2 years ago today)). Clicking on the tile will cause the display of the archived data. If there are multiple archived data, tiles representative of same can be displayed in reverse chronological order. Accordingly, the example embodiments enable a graphical user interface (GUI) that solves the technical problem of reminding a user of the availability of archived data that may otherwise be forgotten as conventional GUIs in messaging systems may not enable searching archived data.

Figure 1:
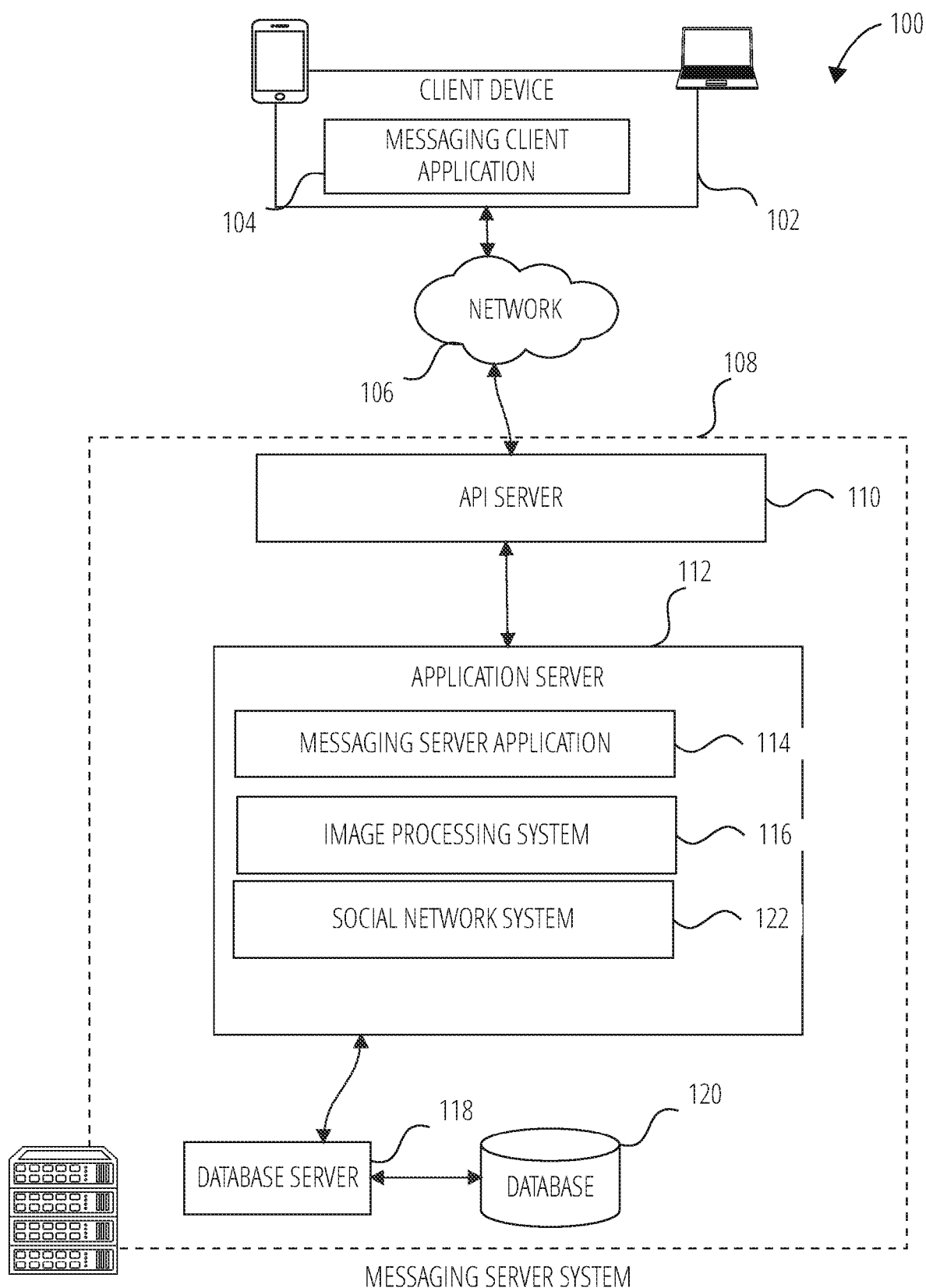
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
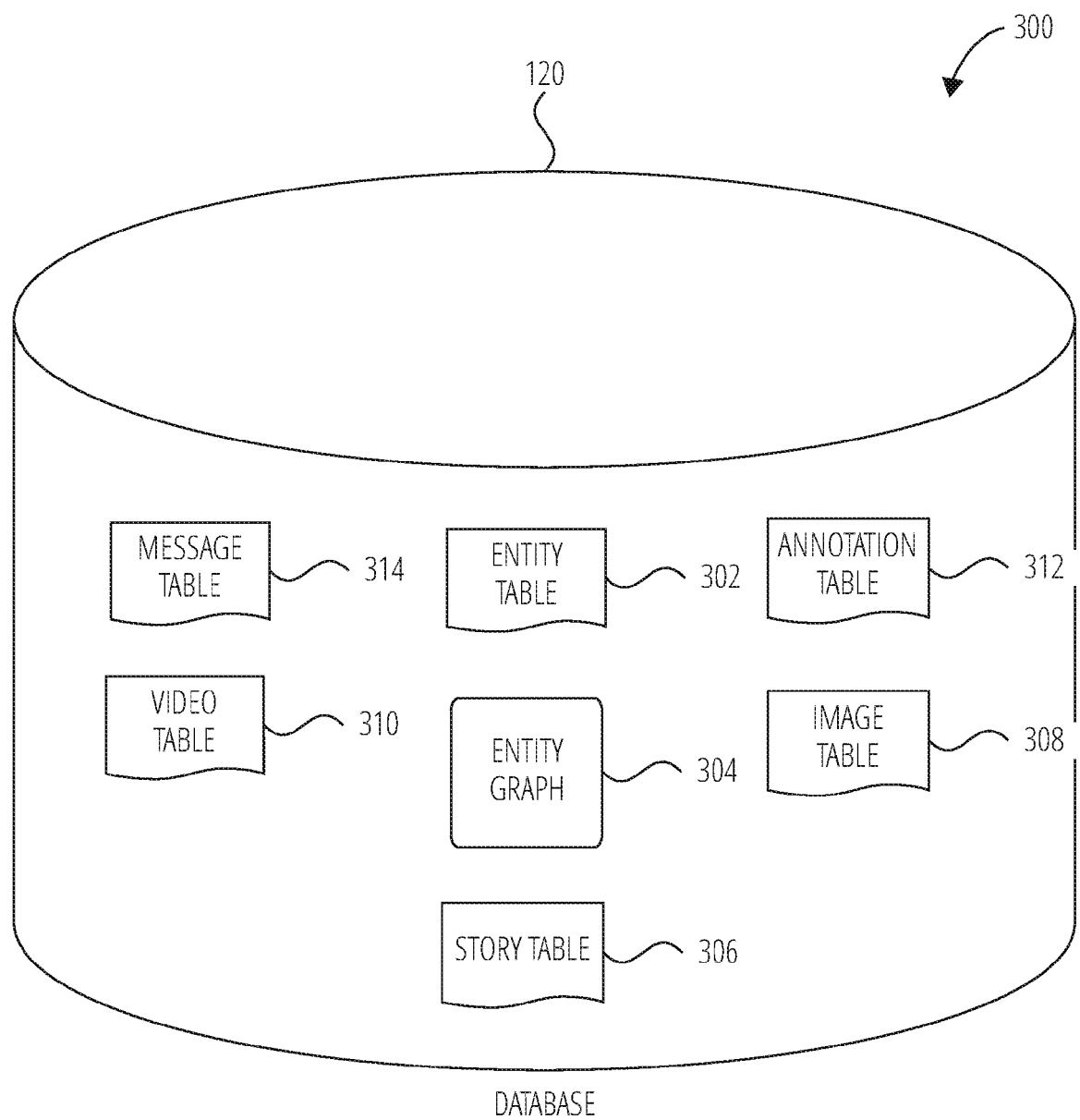
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
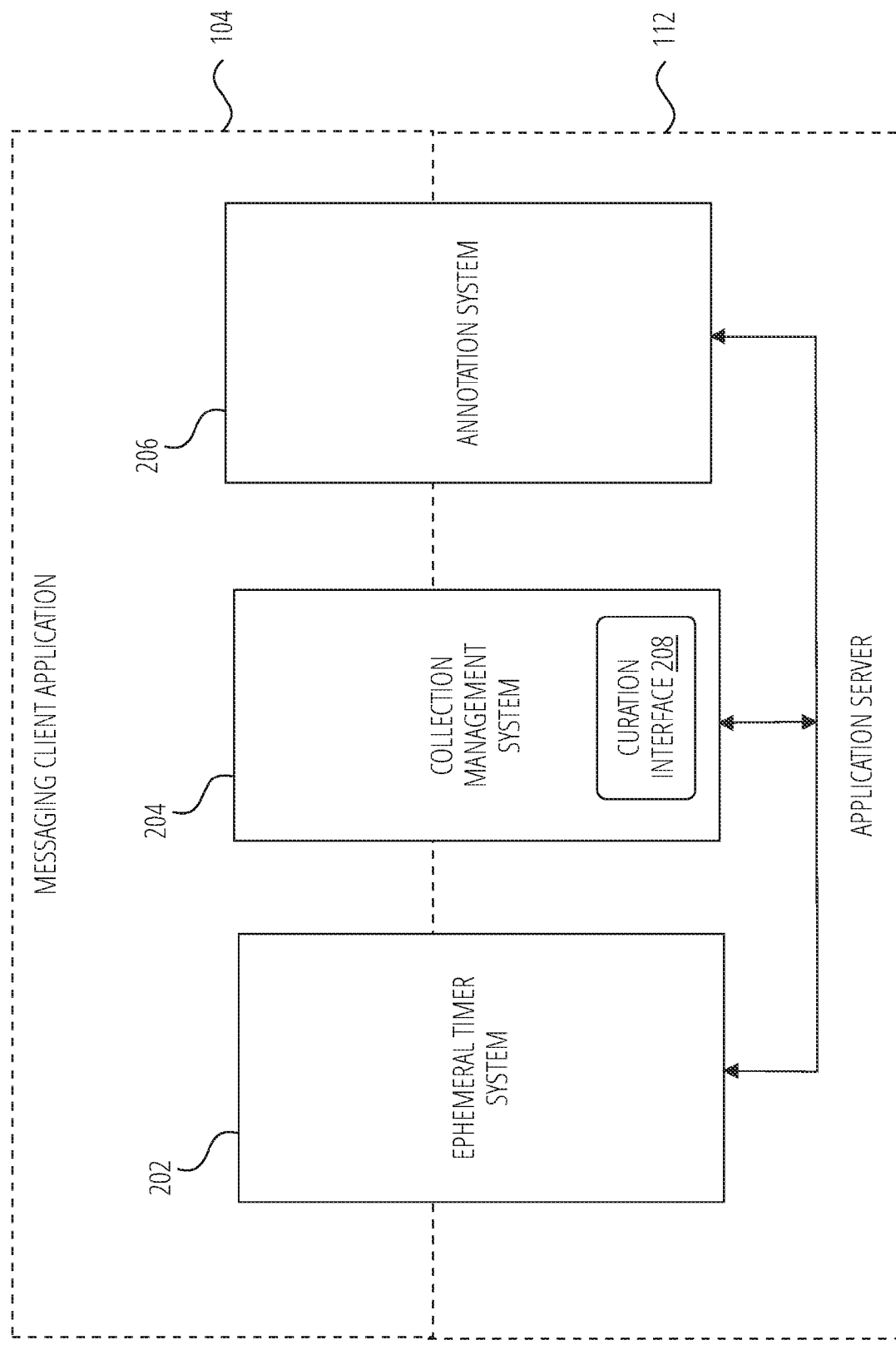
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters ) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
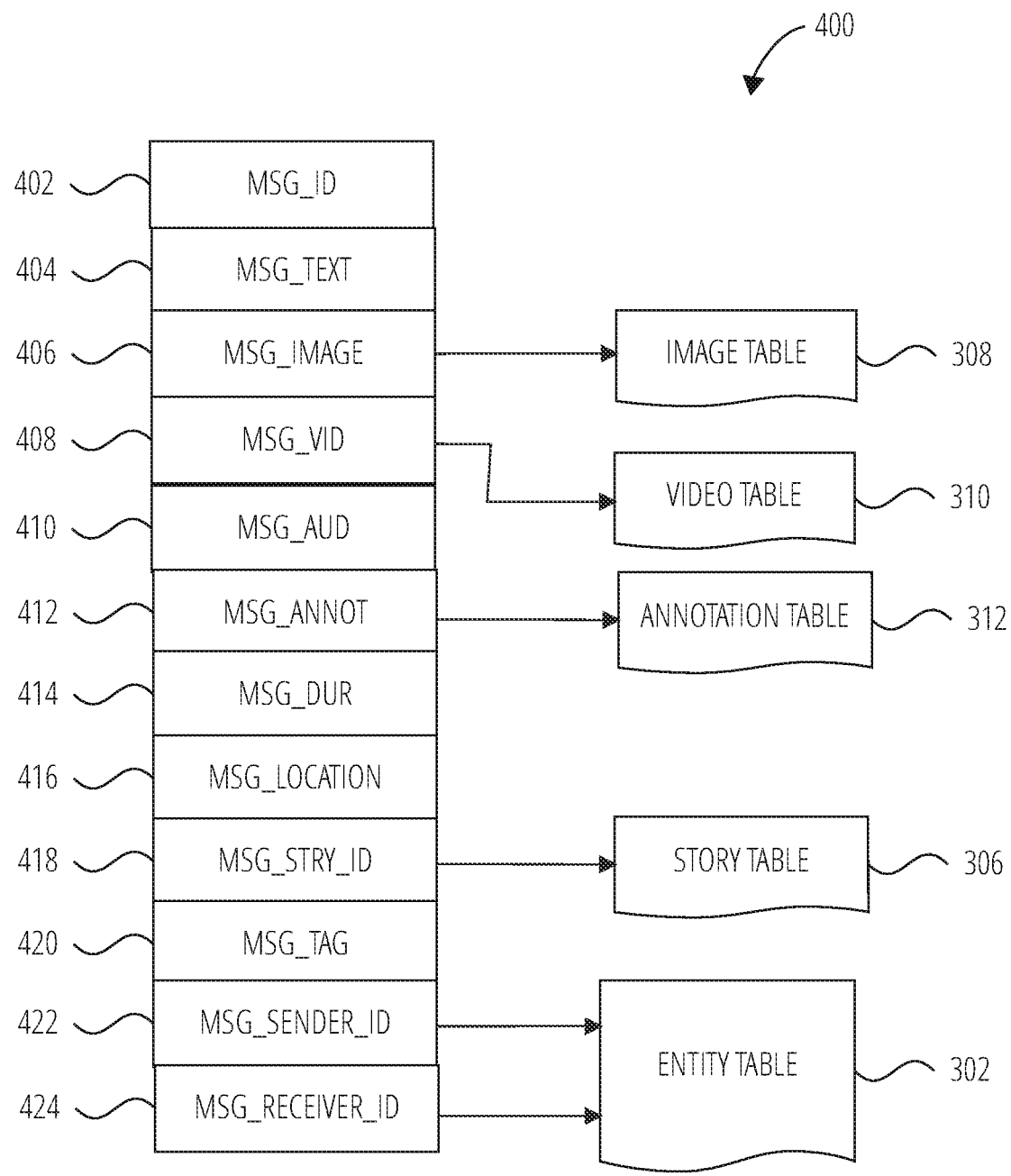
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
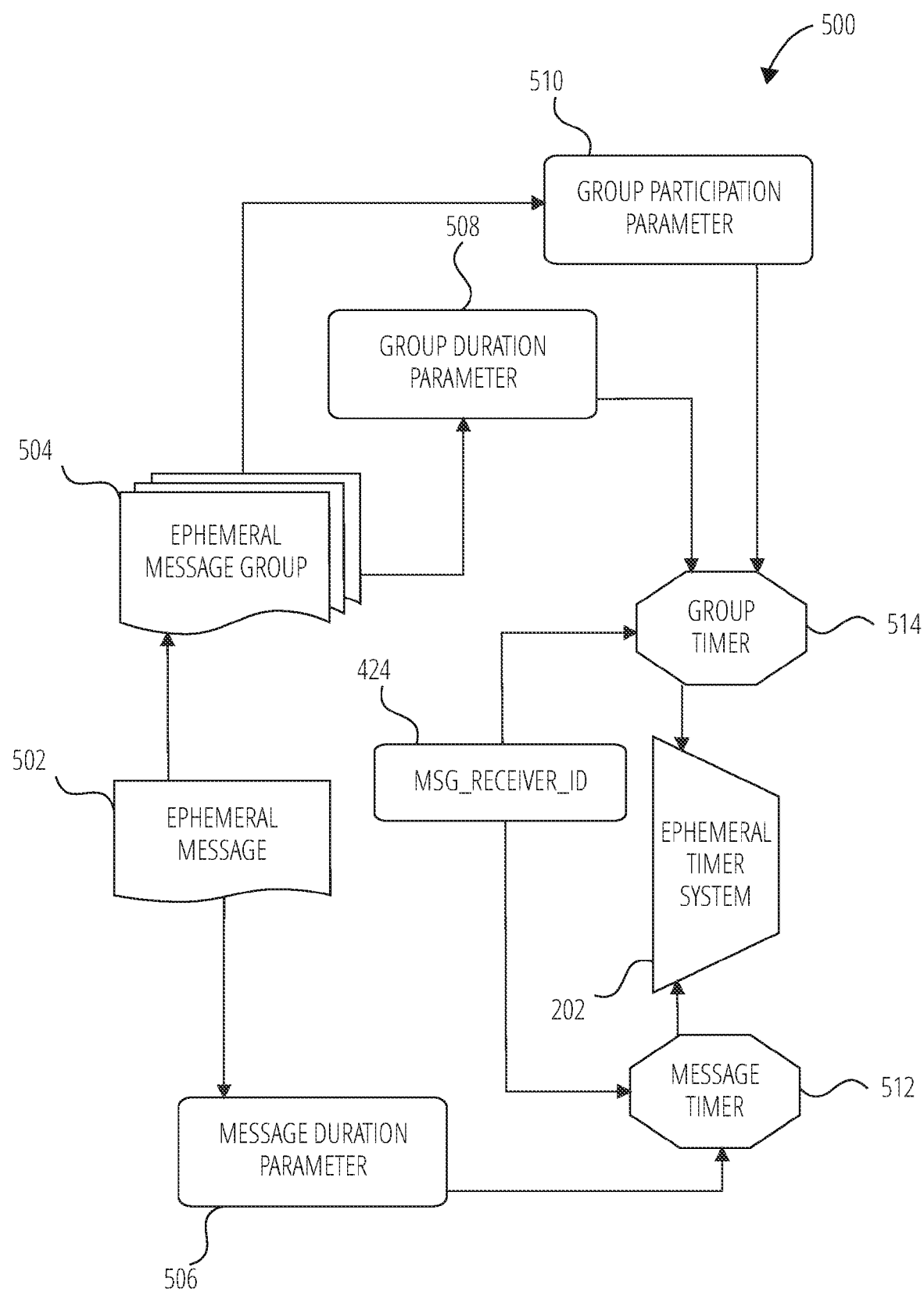
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
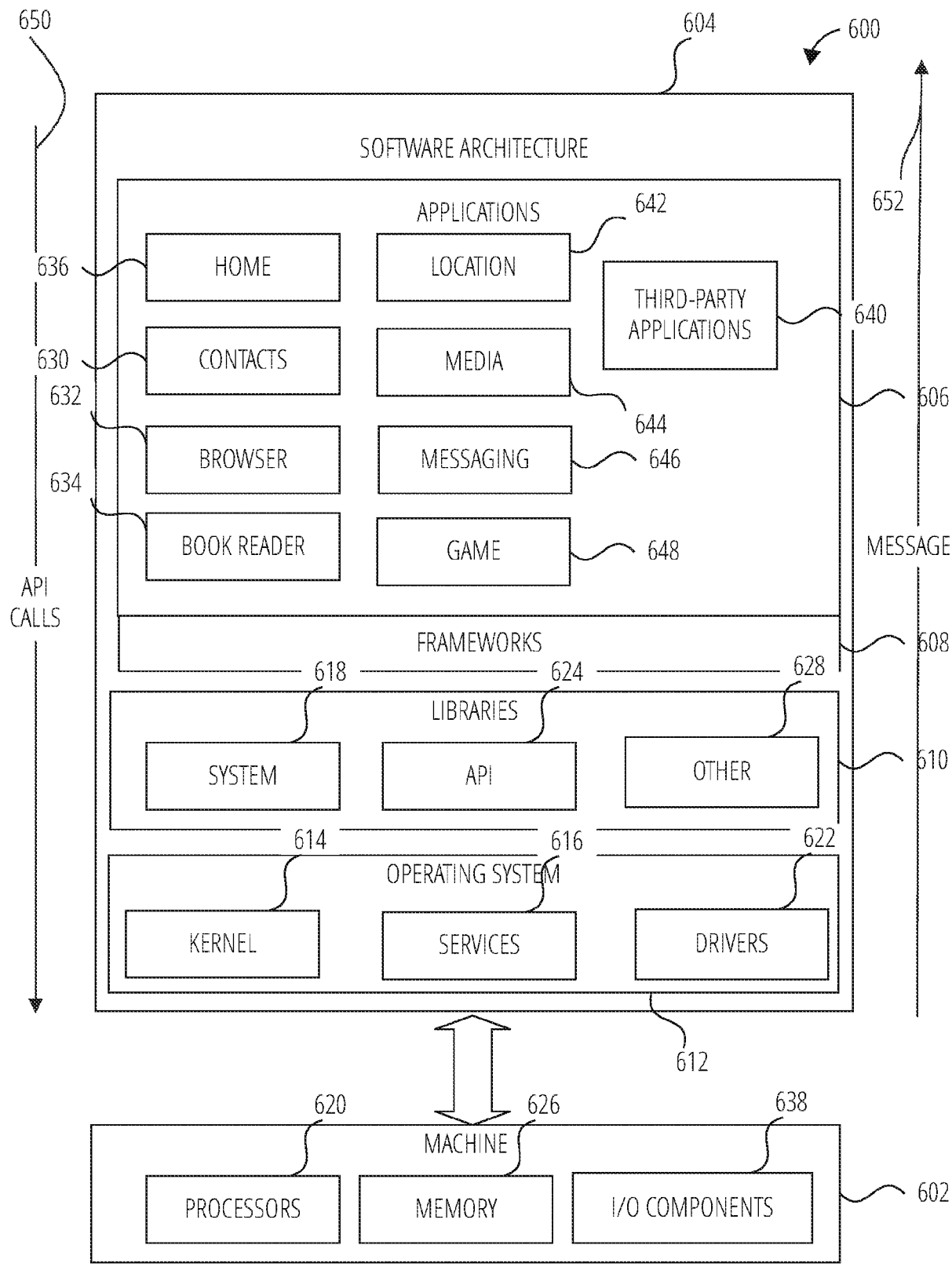
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
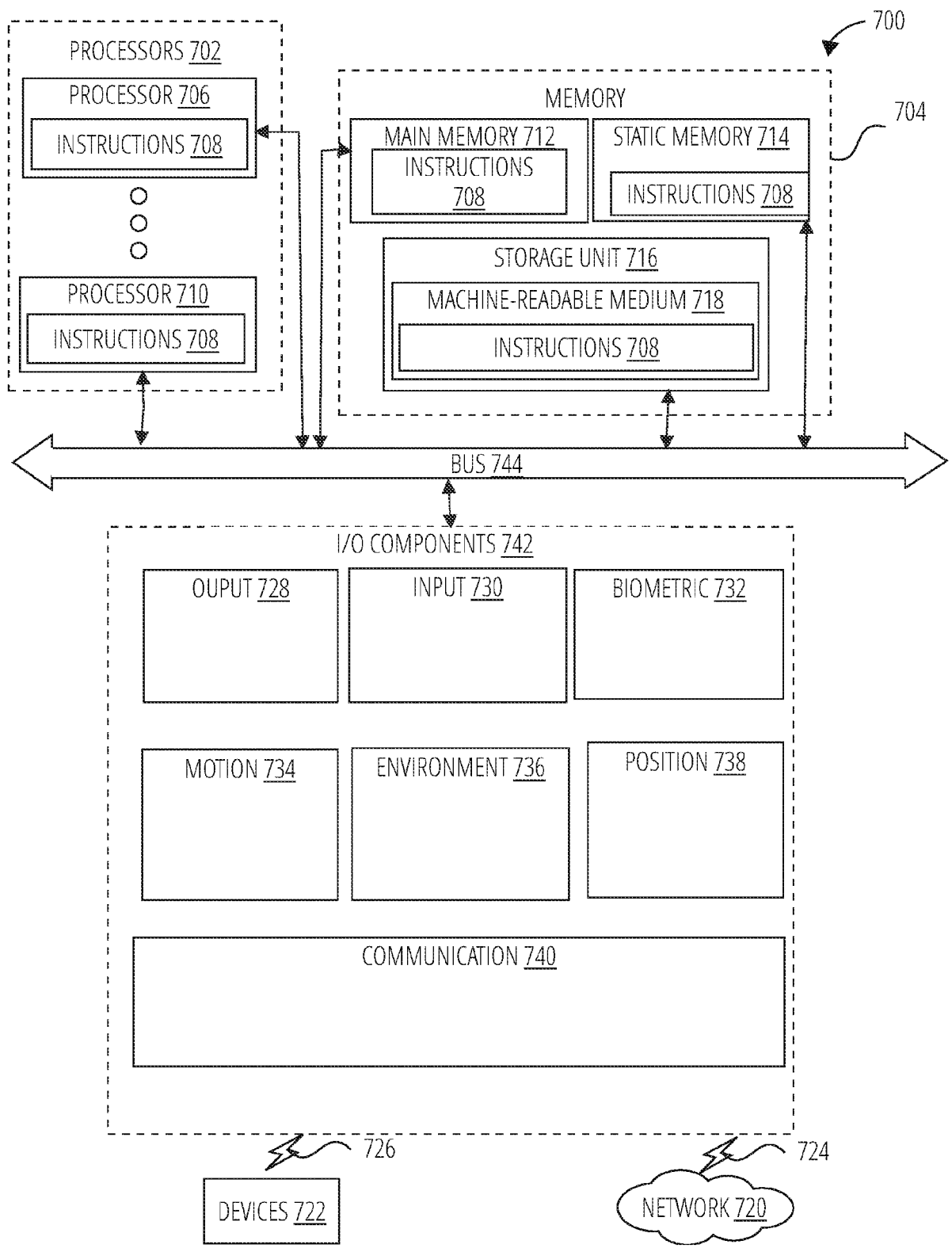
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a RadioFrequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
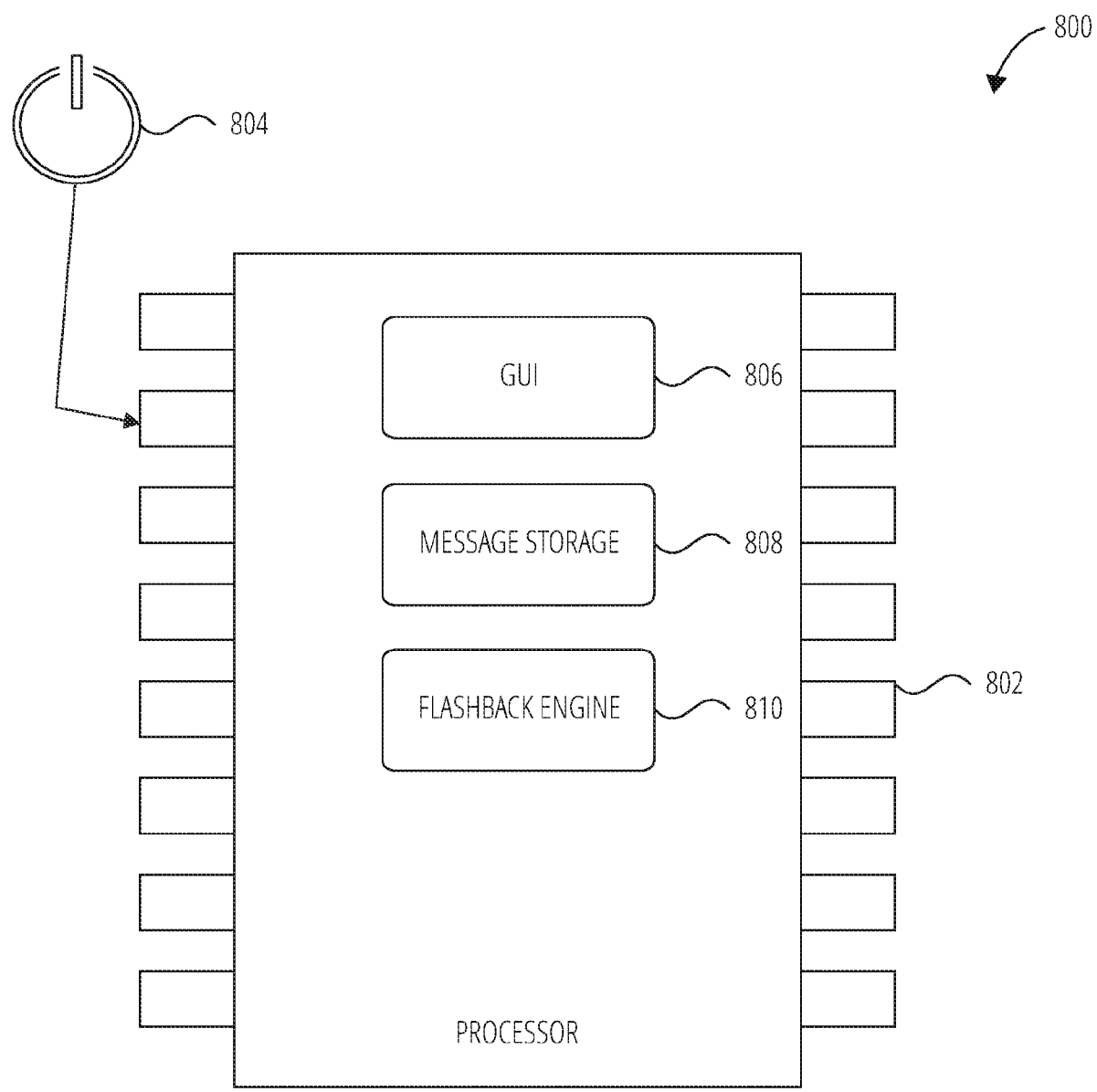
FIG. 8 is a diagrammatic representation of a processing environment, in accordance with some example embodiments.

Turning now to FIG. 8, there is shown a diagrammatic representation of a processing environment 800, which includes a processor 802 (e.g., a GPU, CPU or combination thereof). In one example embodiment, the processing environment resides on a server system (e.g., messaging server system 108).

The processor 802 is shown to be coupled to a power source 804, and to include (either permanently configured or temporarily instantiated) modules, namely a graphical user interface GUI renderer 806 that handles backend processing for rendering a GUI on a display of a device, a message storage 808, and a flashback engine 810. The GUI renderer 806 operationally generates an interface for displaying archived media, the message storage 808 operationally stores the archived media, and the flashback engine 810 operationally determines when to retrieve archived data from the message storage 808 and display the retrieved archived data via the GUI renderer 806, as will be described further below.

Figure 9:
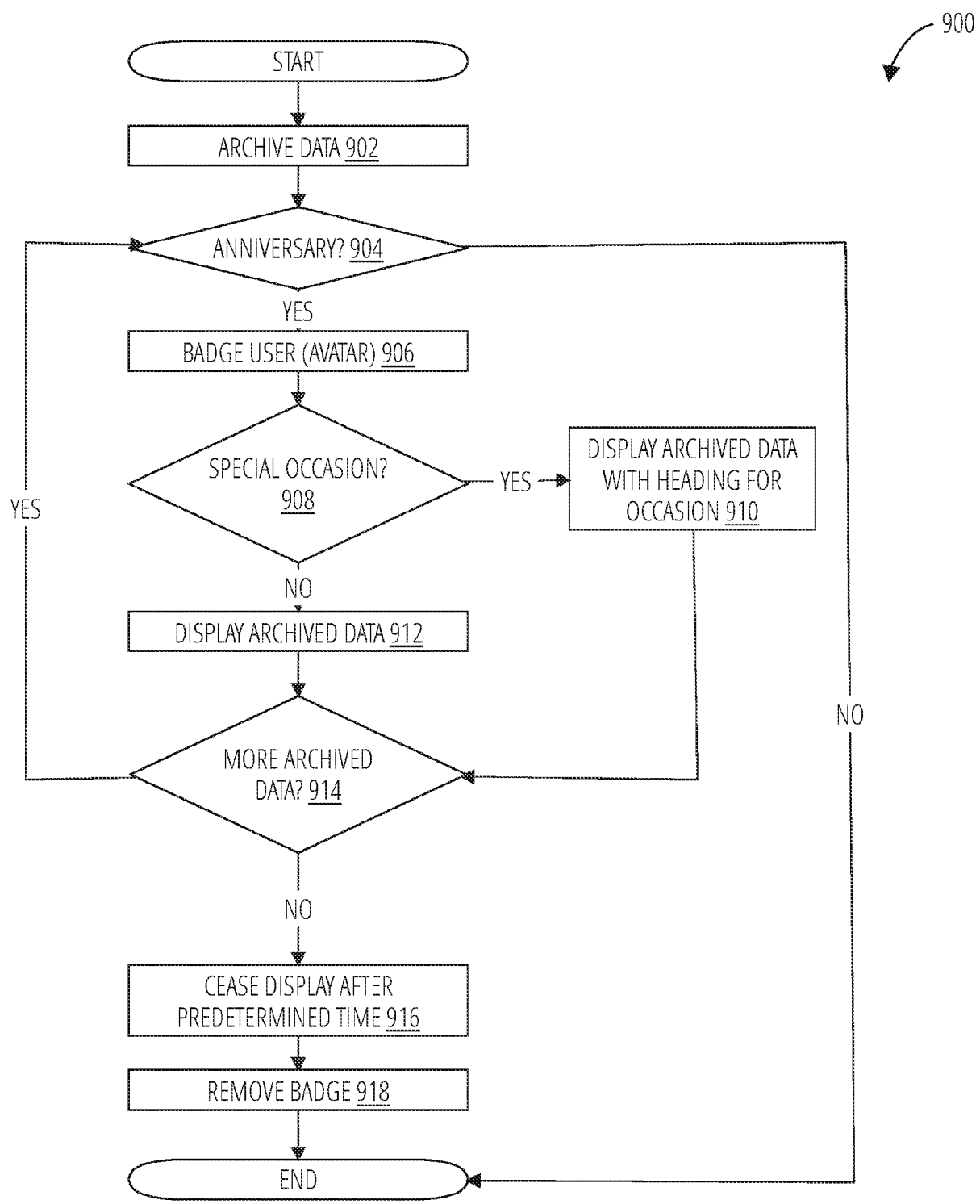
FIG. 9 is a flowchart illustrating a method 900 in accordance with one embodiment.

FIG. 9 illustrates a method 900 in accordance with one embodiment. First, a client device, such as the client device 102 causes the flashback engine 810 on a server, such as the messaging server system 108 comprising the processing environment 800, to archive (block 902) data, such as the ephemeral message 502, to the message storage 808. For example, a user may specify that specific data (e.g., a message comprising an image or video) that was sent and/or received by the user should be archived. The client device will send a command to the flashback engine to archive the specified data. The flashback engine 810 receives the command and archives the specified data.

In another example, data may be archived automatically after a specified period of time after the data was created or saved on the client device 102. In the case of an ephemeral message, the data (e.g., ephemeral message) may be archived automatically after a timer indicates the ephemeral message has expired.

In one example embodiment, the date the data was created and/or saved is also saved with the archived data. In one example, the flashback engine 810 archives the data to one or more data stores on a server system (e.g., messaging server system 108).

The archived data can include data transmitted from a first client device to a second client device. For example, from a user's client device to a second user's client device and might include a message, such as message 502.

Next, the flashback engine 810 determines (decision block 904) if it is an anniversary of the archived data by comparing the current date with an anniversary date. In one example, the anniversary is the date the data was created or archived which is stored with the archived data. In another embodiment, the flashback engine 810 determines (decision block 904) if a prespecified amount of time has passed since the archived data was archived or created to determine if the current data is an anniversary date corresponding to when the archived data was archived or created.

Based on determining that the current date is an anniversary of the archived data, the server system causes (block 906) display of a graphical indicium and an avatar of a user associated with the first client device, on a client device (e.g., via a GUI renderer 806). In one example, the server system causes a graphical indicium in the form of a badge on the avatar to be displayed on the client device. The badge may indicate an anniversary. For example, a badge may include a yellow indicium in a top right corner of the avatar as shown in output 1116 of FIG. 11A.

In one example, the client device is associated with a user who archived the data or for which the data was archived. For example, the client device is associated with the user that created the data or sent the data to the flashback engine to be archived. The graphical indicium (e.g., badge) may be displayed in a list of users of the messaging system 100 and/or list of conversations with other users singly or in a group (or list of data exchanged with their client devices). For example, in the display 1102 in FIG. 11A an avatar of Emma in the list 1114 is badged (1116), as will be discussed further below.

The flashback engine 810 also determines if (decision block 908) the current date is a special occasion. A special occasion can be a list of predefined occasions with associated user data, such as birthdays, marriage anniversaries, and so forth, in contrast to the current date being an anniversary of the date the data was archived or created. For example, an anniversary might be 1 year since data was archived while a special occasion would be a birthdate. In one example, the flashback engine 810 determines whether it is a special occasion by comparing the current date with dates stored in the associated user data (e.g., the user's birthdate, the user's wedding date, the user's first day of work). In another embodiment, a special occasion corresponding to the anniversary of the date the data was archived or created can be determined based on data in the archived data. For example, a birthday or wedding anniversary greeting in the archived data would indicate it is a birthday or wedding anniversary.

If it is a special occasion, the client device causes (block 910) the display on a GUI of the client device of a notification correlated to an occasion corresponding to the anniversary of the archived data. In one example, the notification can appear on a tile or overlaying the archived data. In another example, the notification can be a heading displayed on the GUI of the client device. For example, in the case where the special occasion is a birthday, the heading can include the following string:"[Participant first name of Display Name]'s Birthday Flashback." In one example, the birthday may be applicable for more than one user birthday (e.g., users of the first and second client devices). In this case, the users' heading can include, for example, the following title string:"[First participant first name of Display Name] and [second participant first name of Display Name]'s Birthday Flashback," and so on.

A user of the client device displaying the notification can click, touch, or otherwise interact with the notification to cause the display of the archived data on the client device. For example, the client device can detect when the user interacts with the tile and cause display of the archived data related to the occasion. In an embodiment, the archived data can be displayed inside the tile without the need for user interaction to see the data. For example, the data may be a message comprising video and a thumbnail view of the video can be automatically played inside the tile. In one example, the server causes the notification correlated to the occasion corresponding to the anniversary of the archived data to be displayed on the client device by transmitting the archived data from the server to the client device.

If the server determines that there is no special occasion, the server causes display (block 912) on the client device associated with the archived data of a tile on the anniversary with a notification (e.g., heading) of the anniversary substantially similar to the displaying (block 910) above but instead of a special occasion notification, a generic notification is provided. For example, "Our Flashback from [Date; e.g., "February 7"]." The causing to display operation (block 910 or block 912) can also be performed by a client device that caused archiving or did not causing archiving (e.g., a second device if a first device caused the archiving).

A user of the client device displaying the notification can click, touch, or otherwise interact with the notification to cause the display of the archived data on the client device. For example, the client device can detect when the user interacts with a tile comprising the notification and cause display of the archived data related to the occasion. In an embodiment, the archived data can be displayed inside the tile without the need for user interaction to see the data. For example, the data may be a message comprising video and a thumbnail view of the video can be automatically played inside the tile. In one example, the server causes the notification correlated to the occasion corresponding to the anniversary of the archived data to be displayed on the client device by transmitting the archived data from the server to the client device.

If (decision block 914) there is more archived data, the method 900 returns to decision block 904 and displays the additional notifications for an anniversary or special occasion corresponding to archived data in reverse chronological order per block 910 and/or block 912. Selection of a notification (e.g., by a user via a GUI on a client device) will cause display of the corresponding archived data as discussed above. In an embodiment, the archived data can be displayed inside a tile by, for example, auto playing a thumbnail version of the archived data, as also described above.

If there is no more archived data at block 914, the GUI renderer 806 causes (block 916) the graphical indicium and/or notification associated with the data to cease to display on the client device after a predetermined time (e.g., one full day). For example, the badge is removed (block 918) after the predetermined time and/or after archived data is displayed (block 912). In one example, the predetermined time is 24 hours starting at midnight of the client device in the earliest time zone. The method 900 then ends.

In an embodiment, the method 900 further comprises receiving a command from the first or second device to cease displaying the archived data so that the GUI renderer 806 ceases the display of a notification on the first and/or second mobile device.

In an embodiment, a user can send a command to re-save the archived data (e.g., a media collection) including the notification (e.g., related to an anniversary and/or special occasion?), and the flashback engine 810 will create a duplicate copy of the media collection in the 'Saved in Chat' section as archived above but further including the notification.

Figure 10:
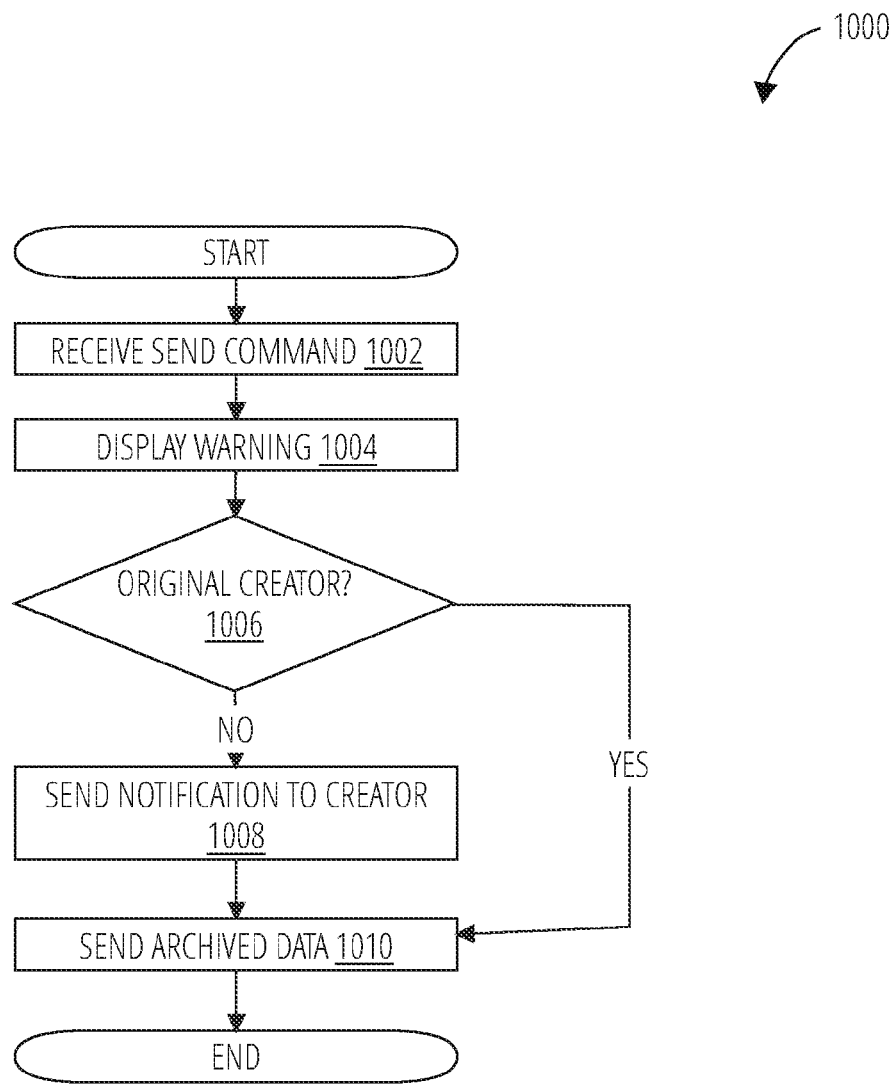
FIG. 10 is a flowchart illustrating a method 1000 in accordance with one embodiment.

FIG. 10 is a flowchart illustrating a method 1000 in accordance with one embodiment for archiving data on a computing device. The method 1000 comprises receiving (block 1002), at a server (e.g., messaging server system 108) from a first client device, a command to send the archived data to a second client device. In one example, the server optionally sends (block 1004) a warning to the first client device related to privacy of the archived data. For example, if the first client device is sending the archived data to a device not associated with the archived data (e.g., that did not create or previously send the archived data), the server can send a privacy warning to the first client device.

The server system determines (decision block 1006) whether the first device that sent the command to send the archived data to the second client device is the original creator of the archived data. If the server system determines that the first device is the original creator (or associated with a user that was the original creator), the archived data is sent (block 1010) to the specified second client device. If the server determines that the first device is not the original creator (or not associated with a user that was the original creator), the server sends (block 1008) a notification to the a client device associated with the original creator indicating that the first device (or a user associated with a first device) has requested that archived data is being sent before sending the archived data to the second device (block 1010). In one embodiment, the original creator can approve or not approve sending of the archived data. In this embodiment, the server only sends the archived data if the server receives approval from the original creator to send the archived data.

Figure 11A:
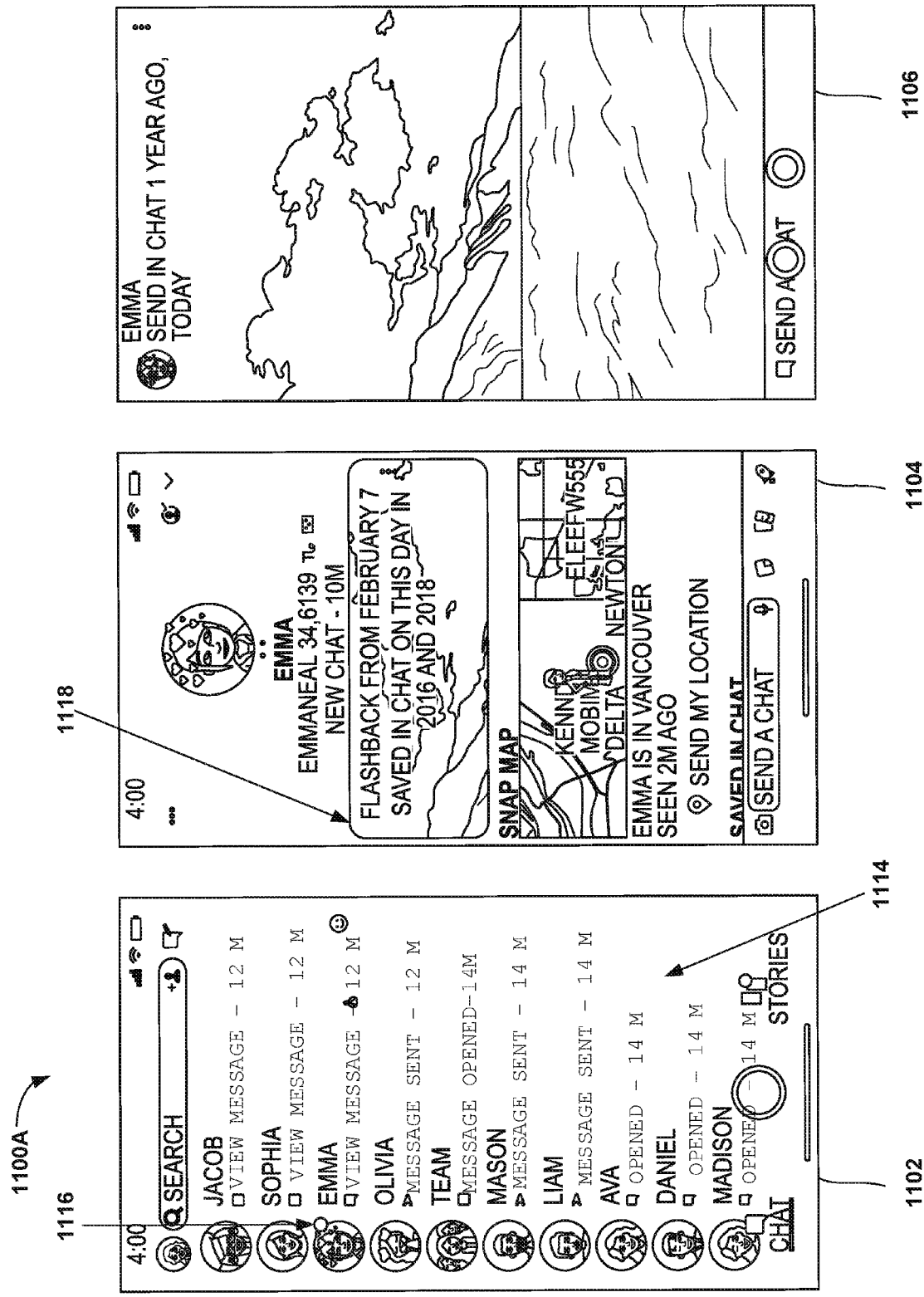
FIGS. 11A and 11B illustrate a GUI output 1100A and 1100B in accordance with one embodiment.

FIG. 11A illustrates example GUI output 1100 in accordance with one embodiment. Output 1102 shows a list of contacts including individuals and groups. The Output 1102 includes a badge 1116 (as described above with respect to block 906) of an avatar of a user to indicate that it is an anniversary of archived data (created and/or archived date). For example, the avatar for user Emma is badged with a yellow badge. If a user selects the badged user, the GUI will display a tile 1118 showing a date of the archived data, as shown in output 1104. If the archived data has not been viewed, a notification dot (e.g., in yellow) can be placed adjacent (e.g., to the right) of a header string. If viewed (e.g., after viewing), the notification dot can be removed. If a user selects the tile 1118 in output 1104, the archived data is displayed, as shown in output 1106.

Figure 11B:
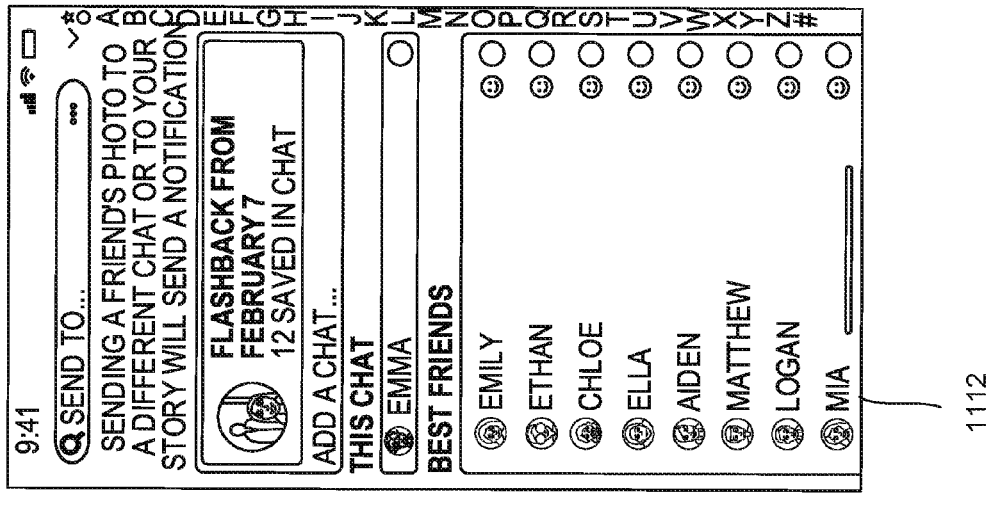
Figure 11B:
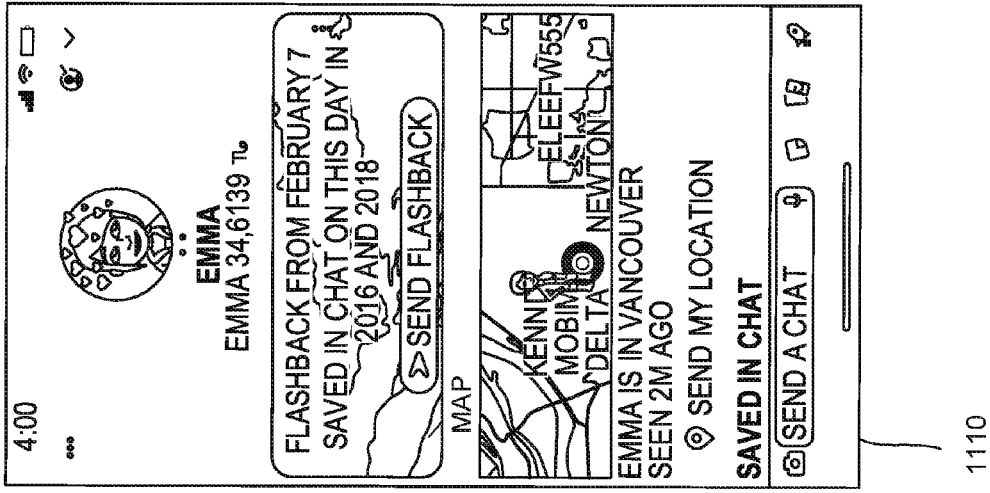
Figure 11B:
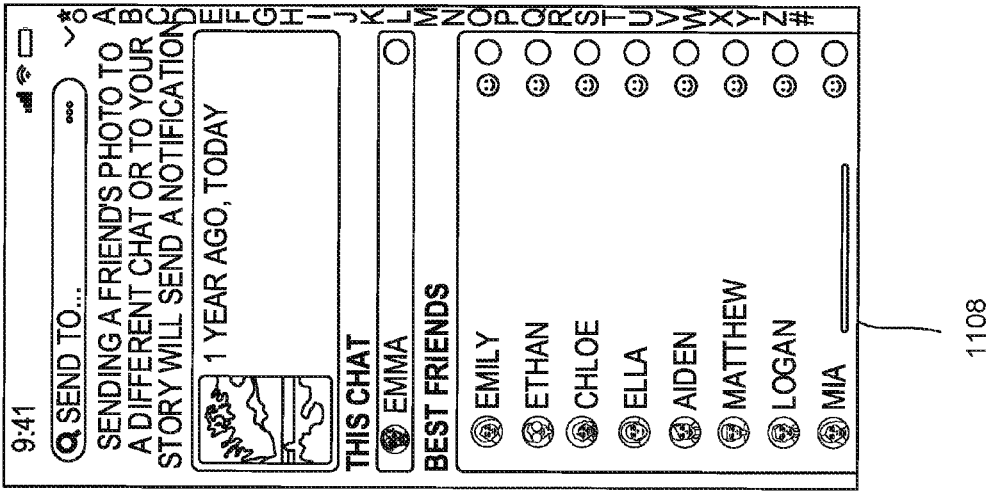

If a user wishes to send archived data to one or more other users, the user can select one or more users from a list of users to which to send the archived data, as shown in output 1108, and output 1112 of FIG. 11B. In one example, the archived data can be sent with a pre-inputted heading matching the notification (e.g., "Our Flashback from ...".

Accordingly, embodiments enable the transmission and display of archived data on anniversary dates thereby improving access to the archived data.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-Readable Medium" refers to machine-storage media . The terms "machine-readable medium," "computer-readable medium" and "device-readable medium" mean the same thing and may be used interchangeably in this disclosure.

"Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magnetooptical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The following examples describe various embodiments of methods, machine-readable media, and systems (e.g., machines, devices, or other apparatus) discussed herein.

1. A computer-implement method of displaying archived data, comprising:
   determining, by a server system, that it is an anniversary of the archived data, the archived data including a message transmitted from a first client device to a second client device;
   causing, by the server system, display, on the first client device, of a graphical indicium and an avatar of a user associated with the first client device, the graphical indicium indicating an anniversary associated with the message transmitted from the first client device to the second client device;
   causing, by the server system, display on the first client device of a notification of the anniversary; and
   causing, by the server, the display of the graphical indicium and notification of the anniversary to be removed after a predefined time.
2. The method of example 1, wherein the message is an ephemeral message.
3. The method of example 1, further comprising causing a heading correlated to an occasion corresponding to the anniversary of the archived data to be displayed on the first client device.
4. The method of example 1, further comprising causing display, in reverse chronological order, of additional archived data on the first client device that archived the additional data.
5. The method of example 1, further comprising causing display of the archived data on the second client device.
6. The method of example 1, further comprising:
   receiving, at the server from the first or second client device, a command to send the archived data to a third client device;
   sending, by the server, to a creator of the archived data, a notification of the command to send; and
   sending, by the server, the archived data to the third client device upon receiving approval to do so from the creator of the archived data.

7. A server system for transmitting mobile device battery data, comprising:
   one or more processors of a server;
   a memory storing instruction that, when executed by the one or more processors, cause the server to perform operations comprising:
   determining, by the server system, that it is an anniversary of the archived data, the archived data including a message transmitted from a first client device to a second client device; causing, by the server system, display, on the first client device, of a graphical indicium and an avatar of a user associated with the first client device, the graphical indicium indicating an anniversary associated with the message transmitted from the first client device to the second client device;
   causing, by the server system, display on the first client device of a notification of the anniversary; and
   causing, by the server, the display of the graphical indicium and notification of the anniversary to be removed after a predefined time.
8. The system of example 7, wherein the message is an ephemeral message.
9. The system of example 7, wherein the operations further comprise causing a heading correlated to an occasion corresponding to the anniversary of the archived data to be displayed on the first client device.
10. The system of example 7, wherein the operations further comprise causing display of the archived data on the second client device e.
11. The system of example 7, wherein the operations further comprise causing display, in reverse chronological order, of additional archived data on the first client device that archived the additional data.
12. The system of example 7, wherein the operations further comprise:
   receiving, at the server from the first or second client device, a command to send the archived data to a third client device;
   sending, by the server, to a creator of the archived data, a notification of the command to send; and
   sending, by the server, the archived data to the third client device upon receiving approval to do so from the creator of the archived data.
13. A machine-readable storage device embodying instructions that, when executed by a server system, cause the server to perform operations comprising:
   determining, by the server system, that it is an anniversary of the archived data, the archived data including a message transmitted from a first client device to a second client device; causing, by the server system, display, on the first client device, of a graphical indicium and an avatar of a user associated with the first client device, the graphical indicium indicating an anniversary associated with the message transmitted from the first client device to the second client device;
   causing, by the server system, display on the first client device of a notification of the anniversary; and
   causing, by the server, the display of the graphical indicium and notification of the anniversary to be removed after a predefined time.
14. The machine-readable storage device of example 13, wherein the message is an ephemeral message.
15. The machine-readable storage device of example 13, wherein the operations further comprise causing a heading correlated to an occasion corresponding to the anniversary of the archived data to be displayed on the first client device.
16. The machine-readable storage device of example 13, wherein the operations further comprise causing display of the archived data on the second client device.
17. The machine-readable storage device of example 13, wherein the operations further comprise causing display, in reverse chronological order, of additional archived data on the first client device that archived the additional data.
18. The machine-readable storage device of example 13, wherein the operations further comprise:
   receiving, at the server from the first or second client device, a command to send the archived data to a third client device;
   sending, by the server, to a creator of the archived data, a notification of the command to send; and
   sending, by the server, the archived data to the third client device upon receiving approval to do so from the creator of the archived data.
19. The machine-readable storage device of example 13, wherein the causing displaying displays a thumbnail view of video inside a tile.
20. The machine-readable storage device of example 13, wherein the graphical indicium is a badge.

What is claimed is:
1. A computer-implemented method of displaying archived data, comprising:
   relaying, from a first client device to a second client device by a server system, a message generated by the first device, the message having video;
   after the relaying, in response to a request from the first client device, archiving, by the server system on a server of the server system, user-selected data including the message;
   determining, by the server system, that a current date is an anniversary of the archived data;
   causing, by the server system, display of a list of users on the first client device, the list of users including at least a first user associated with the second client device and having a graphical indicium and a second user associated with a third client device and not having the graphical indicium, the graphical indicium indicating an anniversary associated with the message transmitted from the first client device to the second client device;
   causing, by the server system, display on the first client device of a notification of the anniversary; and
   causing, by the server system, automatic display of the video on the first client device in a thumbnail view without a user command.
2. The method of claim 1, wherein the message is an ephemeral message.
3. The method of claim 1, further comprising:
   causing a heading correlated to an occasion corresponding to the anniversary of the archived data to be displayed on the first client device.
4. The method of claim 1, further comprising:
   causing display, in reverse chronological order, of additional archived data on the first client device that archived the additional data.
5. The method of claim 1, further comprising:
   causing display of the archived data on the second client device.
6. The method of claim 1, further comprising:

receiving, at the server from the first or second client device, a command to send the archived data to a third client device;

sending, by the server, to a creator of the archived data, a notification of the command to send; and sending, by the server, the archived data to the third client device upon receiving approval to do so from the creator of the archived data.

7. The method of claim 1, further comprising ceasing displaying the video on the first client device in response to a command from the second client device.

8. A server system for displaying archived data, comprising:

one or more processors of a server;

a memory storing instruction that, when executed by the one or more processors, cause the server system to perform operations comprising:

relaying, from a first client device to a second client device, a message generated by the first client device, the message including video;

after the relaying, in response to a request from the first client device, archiving user-selected data including the message;

determining that a current date is an anniversary of the archived data;

causing display, on the first client device, of a list of users, the list of users including at least a first user associated with the second client device having a graphical indicium and a second user associated with a third client device not having the graphical indicium, the graphical indicium indicating an anniversary associated with the message transmitted from the first client device to the second client device;

causing display on the first client device of a notification of the anniversary; and causing automatic display of the video on the first client device in a thumbnail view without a user instruction.

9. The system of claim 8, wherein the message is an ephemeral message.

10. The system of claim 8, wherein the operations further comprise causing a heading correlated to an occasion corresponding to the anniversary of the archived data to be displayed on the first client device.

11. The system of claim 8, wherein the operations further comprise causing display of the archived data on the second client device.

12. The system of claim 8, wherein the operations further comprise causing display, in reverse chronological order, of additional archived data on the first client device that archived the additional data.

13. The system of claim 8, wherein the operations further comprise:

receiving, from the first or second client device, a command to send the archived data to a third client device;

sending, to a creator of the archived data, a notification of the command to send; and sending the archived data to the third client device upon receiving approval to do so from the creator of the archived data.

14. A non-transitory machine-readable storage device embodying instructions that, when executed by a server system, cause the server system to perform operations comprising:

relaying, from a first client device to a second client device, a message generated by the first client device, the message including video;

after the relaying, in response to a request from the first client device, archiving user-selected data including the message;

determining that a current date is an anniversary of the archived data;

causing display, on the first client device, of a list of users, the list of users including at least a first user associated with the second client device having a graphical indicium and a second user associated with a third client device not having the graphical indicium, the graphical indicium indicating an anniversary associated with the message transmitted from the first client device to the second client device;

causing display on the first client device of a notification of the anniversary; and causing, by the server system, display of the video on the first client device in a thumbnail view without a user interaction.

15. The machine-readable storage device of claim 14, wherein the message is an ephemeral message.

16. The machine-readable storage device of claim 14, wherein the operations further comprise causing a heading correlated to an occasion corresponding to the anniversary of the archived data to be displayed on the first client device.

17. The machine-readable storage device of claim 14, wherein the operations further comprise causing display of the archived data on the second client device.

18. The machine-readable storage device of claim 14, wherein the operations further comprise causing display, in reverse chronological order, of additional archived data on the first client device that archived the additional data.

19. The machine-readable storage device of claim 14, wherein the operations further comprise:

receiving, from the first or second client device, a command to send the archived data to a third client device;

sending, to a creator of the archived data, a notification of the command to send; and sending the archived data to the third client device upon receiving approval to do so from the creator of the archived data.

20. The machine-readable storage device of claim 14, wherein the graphical indicium is a badge.

* * * * *